United States Patent
Mann et al.

(10) Patent No.: US 7,144,293 B2
(45) Date of Patent: Dec. 5, 2006

(54) SQUEEZABLE TOY WITH SOUND-EMITTING DEVICE

(75) Inventors: Charles D. Mann, Burnsville, MN (US); Raymond J. Hedlund, Concord, CA (US)

(73) Assignee: Premier Pet Products, LLC, Richmond, VA (US)

( * ) Notice: Subject to any disclaimer, the term of this patent is extended or adjusted under 35 U.S.C. 154(b) by 59 days.

(21) Appl. No.: 10/916,940

(22) Filed: Aug. 12, 2004

(65) Prior Publication Data

US 2005/0042972 A1    Feb. 24, 2005

Related U.S. Application Data (63) Continuation-in-part of application No. 10/152,410, filed on May 21, 2002, now abandoned.

(51) Int. Cl.
*A63H 3/28* (2006.01)

(52) U.S. Cl. ...................................... 446/184; 119/702

(58) Field of Classification Search ................ 446/183, 446/184; 119/702, 707–71
See application file for complete search history.

(56) References Cited

U.S. PATENT DOCUMENTS

| | | |
|---|---|---|
| 1,006,182 A | 10/1911 | Cousin |
| 1,022,112 A | 4/1912 | Smith |
| 1,031,095 A | 7/1912 | Smith |
| 1,149,170 A | 8/1915 | Allis |
| 1,483,165 A | 2/1924 | Eaton |
| 1,534,964 A | 4/1925 | Kahnweiler |
| 1,843,864 A | 2/1932 | Burnett |
| 2,086,631 A | 7/1937 | Munro ......................... 272/86 |
| 2,194,736 A | 3/1940 | Bruler ......................... 272/86 |
| 2,610,851 A | 9/1952 | Jones ............................. 272/8 |
| 2,745,214 A * | 5/1956 | Lawson ....................... 446/184 |
| D188,179 S | 6/1960 | Tay ................................. D12/2 |
| 3,071,476 A | 1/1963 | Werft et al. |
| 3,104,648 A | 9/1963 | Fisher .......................... 119/29 |
| 3,107,651 A | 10/1963 | Beck ............................ 119/29 |
| 3,122,129 A | 2/1964 | Wise ............................ 119/51 |
| 3,200,537 A | 8/1965 | Glass et al. ................. 446/190 |
| 3,481,070 A | 12/1969 | Baulard-Cogan ........... 446/198 |
| 3,664,303 A | 5/1972 | Baensch ....................... 119/51 |
| 3,785,347 A | 1/1974 | Dinnerstein .................. 119/29 |
| 3,871,334 A | 3/1975 | Axelrod ..................... 119/29.5 |
| 3,899,607 A | 8/1975 | Miller et al. ................ 426/285 |
| 3,956,850 A | 5/1976 | Seidenberg ................. 446/184 |

(Continued)

FOREIGN PATENT DOCUMENTS

CA    2240524    6/1997

(Continued)

OTHER PUBLICATIONS

"Kitt'N Gym" Advertisement, circa 1989.

(Continued)

*Primary Examiner*—Kien Nguyen
(74) *Attorney, Agent, or Firm*—Leanne R. Taveggia; Westman, Champlin & Kelly, P.A.

(57) ABSTRACT

A toy comprises a three-dimensional body that can be compressed to actuate a squeaker chamber to move air through a squeaker device. The squeaker chamber is formed by an elongated resilient member in the toy body that can be actuated to operate the squeaker device from a location on the toy distal from the squeaker device. In one embodiment, the resilient member is one or more elastic bladders and in another embodiment the resilient member is one or more resilient tubes. The squeaker chamber may be of various configurations for a variety of toy shapes.

16 Claims, 8 Drawing Sheets

U.S. PATENT DOCUMENTS

| | | | | |
|---|---|---|---|---|
| 3,964,438 | A | 6/1976 | Rodemeyer | 426/132 |
| 4,032,665 | A | 6/1977 | Millet et al. | 426/104 |
| 4,067,138 | A | 1/1978 | Cederholm et al. | 446/183 |
| 4,124,952 | A | 11/1978 | Terzian | 446/183 |
| 4,391,064 | A | 7/1983 | Lakin et al. | 46/130 |
| 4,513,014 | A | 4/1985 | Edwards | 426/132 |
| 4,557,219 | A | 12/1985 | Edwards | 119/29.5 |
| 4,619,625 | A | 10/1986 | Seki et al. | 446/89 |
| D287,988 | S | 1/1987 | Billinghurst | D21/204 |
| 4,802,444 | A | 2/1989 | Markham et al. | 119/29 |
| D307,339 | S | 4/1990 | Markham et al. | D30/160 |
| 4,919,083 | A | 4/1990 | Axelrod | 119/29 |
| D308,122 | S | 5/1990 | Markham et al. | D30/160 |
| 4,936,809 | A * | 6/1990 | Auer et al. | 446/184 |
| D314,455 | S | 2/1991 | Morton | D30/160 |
| 5,025,753 | A | 6/1991 | Schneider | 119/51.03 |
| 5,098,329 | A | 3/1992 | Tseng | 446/221 |
| 5,123,378 | A | 6/1992 | Bayne | 119/29 |
| 5,165,363 | A | 11/1992 | McGinty | 119/18 |
| RE34,352 | E | 8/1993 | Markham et al. | 119/710 |
| 5,232,130 | A | 8/1993 | Woodard | 222/464 |
| 5,234,726 | A | 8/1993 | Dahan | 428/9 |
| 5,263,436 | A | 11/1993 | Axelrod | 119/710 |
| D343,262 | S | 1/1994 | Axelrod | D30/160 |
| D344,161 | S | 2/1994 | Markham | D30/160 |
| D349,786 | S | 8/1994 | Markham | D30/160 |
| 5,343,828 | A | 9/1994 | Houghton et al. | 119/51.03 |
| 5,351,652 | A | 10/1994 | Budman et al. | 119/711 |
| D357,952 | S | 5/1995 | Chen | D21/191 |
| D359,147 | S | 6/1995 | Hotta et al. | D30/160 |
| 5,421,107 | A | 6/1995 | Bryan | 36/139 |
| 5,462,473 | A | 10/1995 | Sheller | 446/183 |
| 5,536,007 | A | 7/1996 | Snyder | 273/118 R |
| D373,229 | S | 8/1996 | O'Rourke et al. | D30/160 |
| D373,859 | S | 9/1996 | Markham et al. | D30/160 |
| 5,553,570 | A | 9/1996 | VanNatter, III et al. | 119/709 |
| 5,560,320 | A | 10/1996 | Plunk | 111/709 |
| 5,595,142 | A | 1/1997 | Chill | 119/710 |
| 5,619,954 | A | 4/1997 | Rotondi | 119/707 |
| 5,640,931 | A | 6/1997 | Markham | 119/711 |
| D387,513 | S | 12/1997 | Mauldin, Jr. | D30/160 |
| D388,559 | S | 12/1997 | Mauldin, Jr. | D30/160 |
| D393,110 | S | 3/1998 | Mauldin, Jr. | D30/160 |
| 5,799,616 | A | 9/1998 | McClung, III | 119/709 |
| 5,813,366 | A | 9/1998 | Mauldin, Jr. | 119/710 |
| 5,832,877 | A | 11/1998 | Markham | 119/710 |
| 5,857,431 | A | 1/1999 | Peterson | 119/710 |
| 5,865,146 | A | 2/1999 | Markham | 119/707 |
| 5,904,118 | A | 5/1999 | Markham | 119/707 |
| 5,947,061 | A | 9/1999 | Markham et al. | 119/710 |
| 5,965,182 | A | 10/1999 | Lindgren | 426/104 |
| 6,014,950 | A | 1/2000 | Rogers | 119/710 |
| 6,110,001 | A | 8/2000 | Chae | 446/339 |
| 6,112,703 | A | 9/2000 | Handelsman | 119/707 |
| 6,129,053 | A | 10/2000 | Markham | 119/710 |
| 6,216,640 | B1 | 4/2001 | Zelinger | 119/707 |
| 6,422,912 | B1 * | 7/2002 | Summers | 446/184 |
| 6,609,944 | B1 * | 8/2003 | Viola | 446/409 |
| 6,663,457 | B1 * | 12/2003 | Ritchey | 446/71 |
| 2001/0039162 | A1 | 11/2001 | Sabbagh | |

FOREIGN PATENT DOCUMENTS

| | | |
|---|---|---|
| WO | WO 99/25183 | 5/1999 |

OTHER PUBLICATIONS

"Learn & Listen" Advertisement, circa 1990.
"Cat Pursuit Game" Advertisement, circa 1990.
"Dog Play Toy" Advertisement, circa 1990.
Fritz Cat Toys Advertisement, circa 1992.
"Kong Stuffing" Advertising, *Pet Business* Magazine, May 1995.
Recipe for the Perfect Dog, Kong Company brochure, 1997.
"Biscuit Ball" Advertisement, Pet Business, Oct. 1998.

* cited by examiner

FIG. 18

SQUEEZABLE TOY WITH SOUND-EMITTING DEVICE

The present application is a continuation-in-part of application Ser. No. 10/152,410 filed May 21, 2002 for "Squeezable Toy With Sound-Emitting Device" by Charles D. Mann and Raymond J. Hedlund, Sr., the content of which is hereby incorporated by reference in its entirety.

BACKGROUND OF THE INVENTION

This invention relates to squeezable toys, and particularly to non-consumable chewable pet toys having sound-emitting devices for carnivorous animals such as dogs and cats.

Non-consumable chewable pet toys provide a variety of beneficial functions for the pet carnivore. Chewing on such toys provides the carnivore with masticatory exercise, as well as dental prophylaxis. Irregular shapes impart erratic movements to the toy when rolled or bounced, thereby providing exercise for the animal. Such toys often provide a training function, teaching the carnivore to chew on the toy, rather than on furniture or other valuable items.

To enhance the attractiveness of the toy to the carnivore, sensory attractants have been incorporated in the toy. These toys attract the carnivore and encourage the carnivore to chew on the toy, rather than on furniture or other personal property. Thus, the sensory attractant is particularly advantageous as a training device for the carnivore.

One attractant commonly employed in chewable pet toys is a noise-producing device that emits a squeak or other attractant sound due to air flowing through the device when the carnivore chews on the toy. Such a noise-producing device, commonly called a "squeaker", usually comprises a small rigid housing, usually constructed of plastic, forming a passage containing a reed or other acoustic vibrating device that emits a sound when air passes through the passage. The squeaker is ordinarily mounted in an external wall of the toy so that compression of a squeaker chamber within the toy, such as by chewing by the carnivore, forces air through the passage to emit a sound. Upon relaxation of the squeaker chamber, the chamber returns to its relaxed, or inflated, state, drawing air through the squeaker passage and again emitting a sound. In most cases, the squeaker chamber is integral with the toy, although in some cases the squeaker device includes its own chamber. In either case, the squeaker chamber is closed so that the squeaker passage forms the only passage for air into and out of the chamber. The squeaker, and its associated squeaker chamber, are ordinarily confined to a small region of the toy.

Most carnivorous animals are attracted by the sound from the squeaker to chew on the chew toy at the region of the squeaker device. Consequently, most animals tend to chew at only the location of the squeaker in the toy, eventually tearing or rupturing the toy at that location. When the toy tears or ruptures at the region of the squeaker, a risk exists that the animal will dislodge the rigid squeaker housing from the toy and will swallow the squeaker, possibly injuring the animal.

BRIEF SUMMARY OF THE INVENTION

The present invention is directed to a non-consumable toy having a squeaker arranged in such a manner as to provide increased interest to the user, such as an animal. In preferred embodiments, the squeaker is hidden from the user, such as by placing the squeaker at a location in the toy remote from the squeaker chamber. Thus, the risk that the animal will locate and dislodge the squeaker from the toy is minimized.

In one embodiment, a toy includes a squeaker chamber having at least a portion arranged within the toy distal from the squeaker device so that the sound is emitted from a location of the toy different from the location of the squeaker device. The squeaker chamber is in the form of one or more elongated resilient members that together or independently operate one or more squeaker devices.

In some embodiments, a toy comprises a three-dimensional body formed of resilient material, such as fabric or elastomer. A squeaker chamber is enclosed within the body and is collapsible from a relaxed position due to deformation of the body, such as by biting on the body by an animal. The squeaker chamber returns to the relaxed position when the body is released from collapse, such as when the animal releases its bite or grip on the body. A squeaker device is mounted to a wall of the chamber to emit a sound when air passes through the squeaker device due to collapsing or releasing the chamber.

In preferred embodiments, the squeaker chamber is formed of latex or a synthetic elastic material that can be collapsed from a relaxed position when deformed, and which returns to the relaxed position when released. In other embodiments, the squeaker chamber is constructed of one or more tubes within the body.

DETAILED DESCRIPTION

Figure 1:
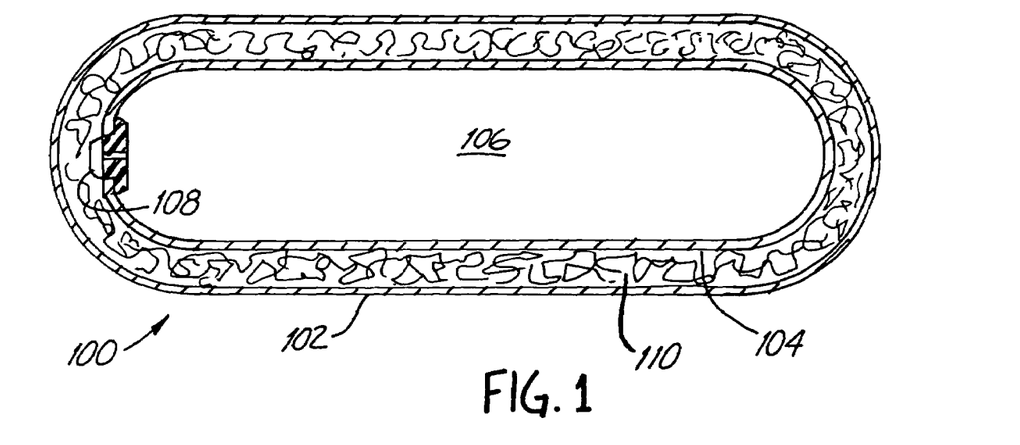
FIG. 1 is a section view of a simple squeaker system according to a preferred embodiment of the present invention.

FIG. 1 is a section view illustrating the principles of a squeaker system in accordance with the presently preferred embodiment of the present invention. Toy 100 includes a three-dimensional compressible body 102 having an outer surface formed of a resilient material, such as a fabric or artificial fur. The squeaker system comprises an elongated resilient bladder 104 having a wall enclosing a squeaker chamber 106 within the body with a squeaker device 108 in the wall of the bladder. Squeaker chamber 106 has a length that extends along the body, adjacent a substantial portion of the surface of the body. In preferred embodiments, a compressible filler material 110, such as a foam or fiber material, is between body 102 and bladder 104.

Bladder 104 is preferably constructed of an elastic material having memory that, after being elongated by a force, will return to approximately its original size upon release of the elongating force. Latex is a suitable material for bladder 104. Natural latex has an elongation factor of 800% to 1000% with a nearly 0% permanent set factor, meaning that the material can be elongated to 800 to 1000% its relaxed size without noticeable permanent deformation, so that upon release of the elongation force the material will return to nearly its original relaxed shape. Synthetic latex exhibits similar characteristics. More particularly, polyurethane latex exhibits an elongation factor of 400 to 1000% with a permanent set factor of 2 to 5%, while silicone latex exhibits an elongation factor of 600 to 1100% and a permanent set factor of 1 to 2%. As will be fully understood hereinafter, the material of bladder 104 is elongated only a limited amount in use. Therefore, while both natural and synthetic latex are examples of materials suitable for the present invention, other elastic materials may be used that exhibit adequate elongation due to expansion of a portion of the bladder while exhibiting a small or minimal permanent set.

Figure 2:
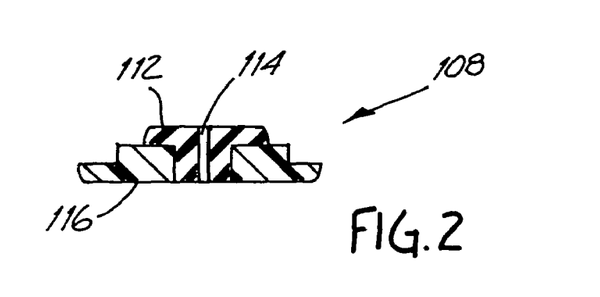
FIG. 2 is an enlarged view of a squeaker device used in the system of FIG. 1.

Squeaker device 108 is shown in greater detail in FIG. 2, and comprises a rigid housing 112 having an air passage 114 therein. A reed or other noise-making device (not shown) is placed in passage 114 so that air passing through passage 114 vibrates the reed or otherwise causes device 108 to emit a sound or noise. Housing 112 is bonded to a carrier 116 constructed of the same material as bladder 104, which is fastened by an adhesive (not shown) to bladder 104 at an opening thereof.

For example, bladder 104 is preferably formed in a mold having a shape that is the same as the relaxed shape of the bladder. Material, such as liquid latex, is admitted through an opening in the mold, and the mold is turned and rotated to move the liquid material throughout the interior of the mold to coat the inside of the mold to a controlled thickness. After the material cures, the bladder is removed from the mold through the mold opening, and squeaker device 108 is fastened to the bladder wall in the aperture left by the mold opening. Thus, the bladder is closed by the squeaker device 108 forming squeaker chamber 106 therein. Toy 100 is completed by placing bladder 104 and squeaker device 108 inside body 102 and surrounded with suitable compressible filling material 110, such as synthetic foam or fibers.

The ease of collapsing or compression of the toy and its internal bladder should be adequate for the expected external force, such as the biting action of a carnivore (in the case of a pet toy) or pressing by a child (in the case of a child's toy). The expected external force will be based on the size of the toy, which in turn is based on the weight of the animal or age of the child, as the case may be.

In use, when the carnivore bites on body 102 (or the child presses on the body), the toy compresses at the location of the bite (or pressure), compressing bladder 104 and displacing air to regions of squeaker chamber 106 distal from the region of the compression. Consequently, air pressure is increased at regions of squeaker chamber 106 distal from the compression.

If the compression occurs at a region distal from squeaker device 108, the air pressure increases near the squeaker device, causing a high volume of air to rapidly be expelled through the squeaker device. Rapid movement of air past the reed or other noise-making element of device 108 causes squeaker device 108 to emit a loud or high intensity sound.

If the compression due to the bite or pressure is near squeaker device 108, the compression forces much of the air to regions of bladder 104 distal from the compression, causing the bladder to expand (elongate) against the compressible filler material 106. A small volume of air is forced through the squeaker device, causing it to emit a sound that is softer than that described above. Typically, a carnivore will release the bite, and hence the compression, shortly after applying it. Consequently, the air forced into the portion of the bladder distal from the compression site returns to the compression site as the bladder relaxes to its normal state. As a result, only a faint or low intensity sound, if any, will emit from the squeaker device should the animal apply its bite near device 108.

In either case, upon relaxation of the compression bite or pressure, bladder 104 returns to its original, relaxed shape, such as the relaxed shape shown in FIG. 1.

Squeaker device 108 may be any suitable sound-emitting device. Some such devices emit sound when air moves through the air passage 114 in either direction, whereas other such devices emit sound when air moves in only one direction through the passage, such as when air is expelled from the toy. Yet other squeaker devices might emit one sound, such as a high pitch sound, when air moves in one direction and another distinctly different sound, such as a low pitch sound, when air moves in the opposite direction.

The phenomenon that the squeaker device 108 emits a louder sound only when the toy is compressed at a region distal from the squeaker device serves to confuse the animal or child playing with the toy, maintaining interest in the toy. More particularly, as the animal or child learns that a more intense sound occurs when the toy is compressed distal from the squeaker device, rather than proximal to it, the animal or child will tend to compress the toy at various regions, not just a single region. Consequently, the life of the toy is extended, as the animal will not quickly chew through the toy at a single region.

One feature of the invention is that bladder 104 may be long as to extend distally from squeaker device 108 so that the squeaker device may be positioned at any desired location within the toy and operated by squeezing the bladder (such as when the animal bites the toy) at another location of the toy distal from the squeaker device. For example, a squeaker system in a toy having an animal or figurine shape might incorporate a squeaker system wherein the squeaker device 108 is positioned in the head of the figure and bladder 104 extends through the body to the arms and legs.

Figure 3:
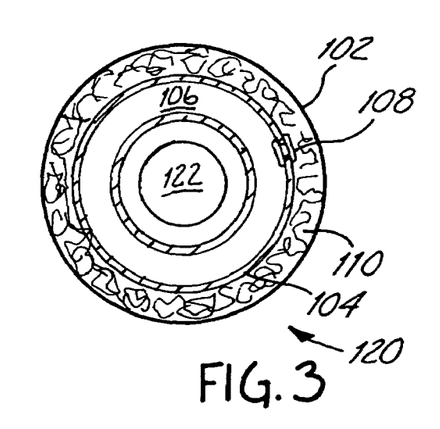
FIGS. 3–6 are views of various embodiments of toys employing squeaker systems according to the principles of the system shown in FIG. 1.
Figure 4:
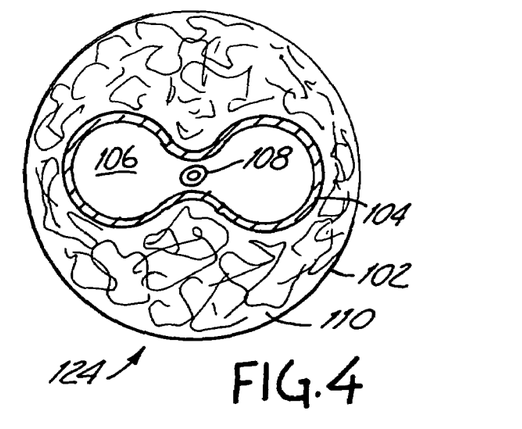
Figure 5:
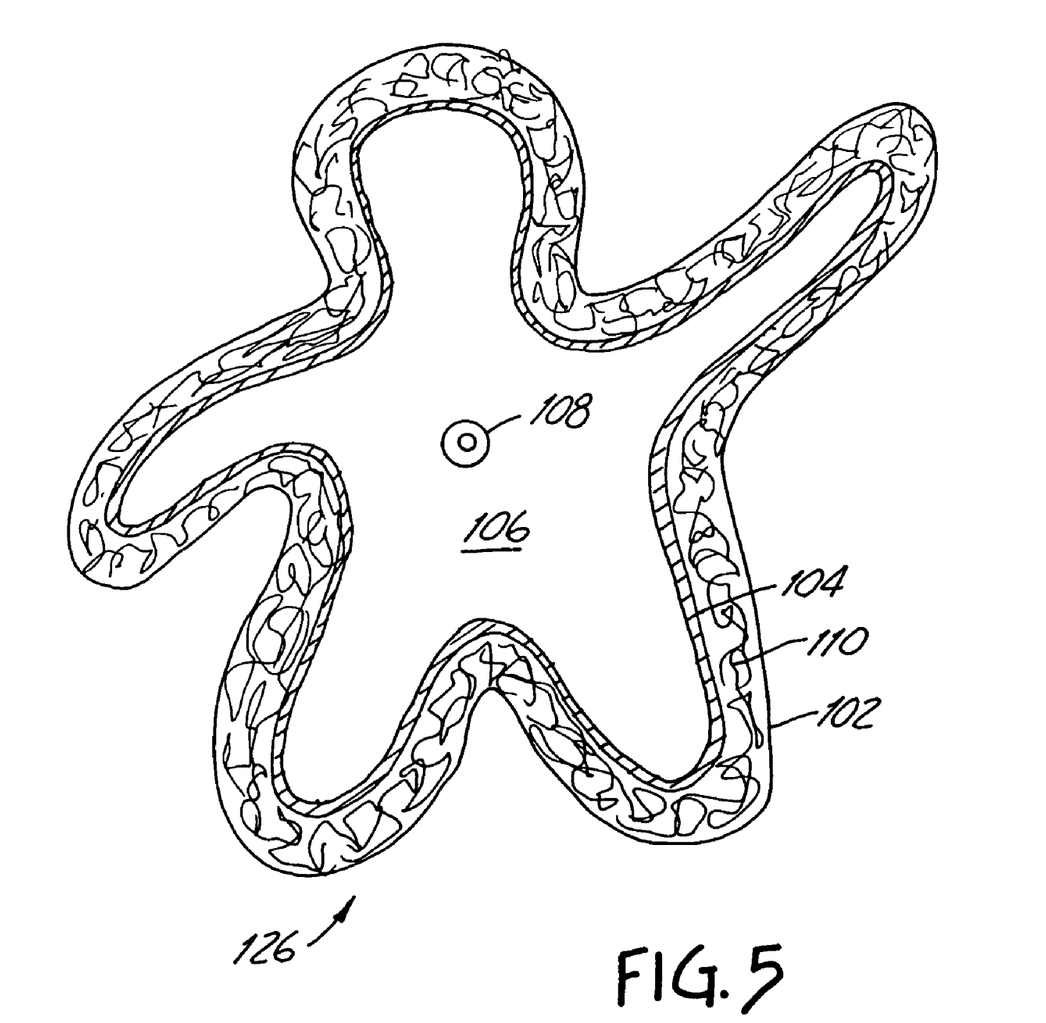
Figure 6:
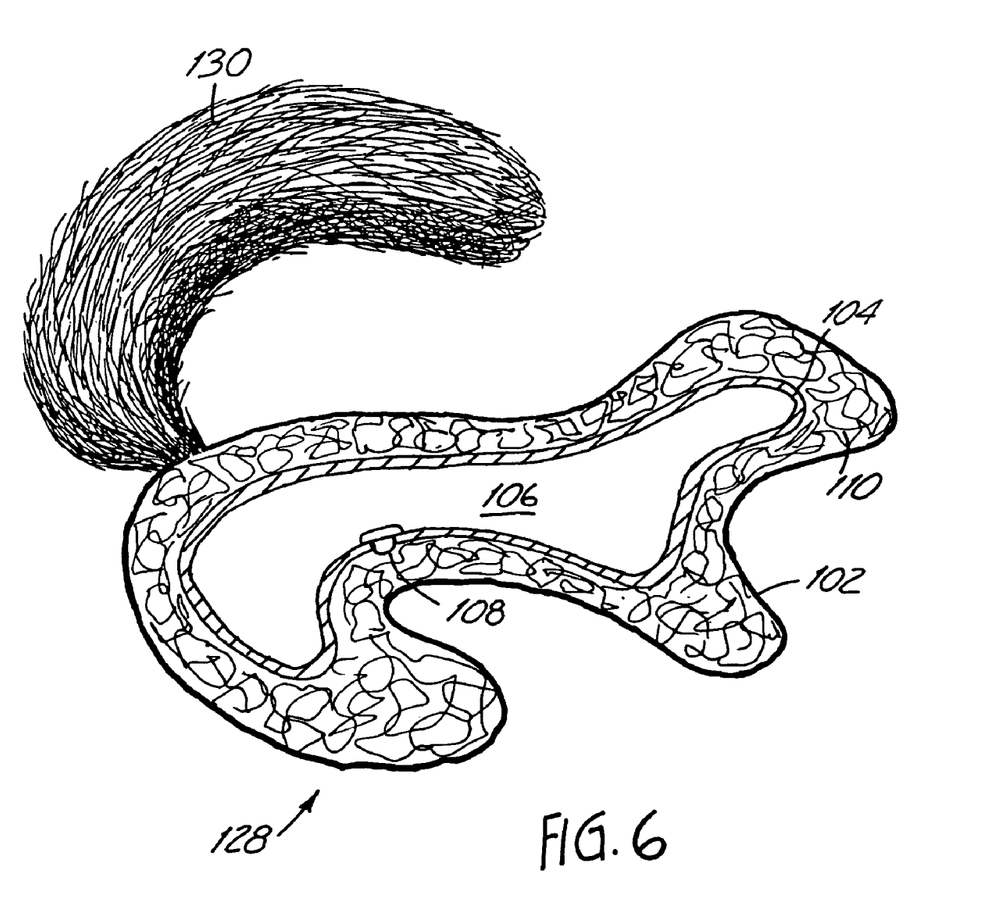

FIGS. 3–6 illustrate various embodiments of toys embodying the principles of the squeaker system illustrated in FIGS. 1 and 2. Thus, FIG. 3 illustrates a toy 120 in the form of a donut or toroid with a central opening 122 surrounded by bladder 104. FIG. 4 illustrates a ball or sphere 124 with a central bladder in the shape of a pair of connected spheres with squeaker device 108 centrally located. FIG. 5 illustrates a toy having appendages simulating arms, legs and a head with a bladder 104 having similar appendages extending into those of the toy and a centrally located squeaker device 108. FIG. 6 illustrates a squirrel toy 128 with a bladder conforming to the shape of the toy. A separate decorative artificial tail 130 might be attached to the toy, as illustrated. Alternatively, tail 130 may itself be formed of fabric and filler and bladder 104 may extend into tail region 130.

Figure 7:
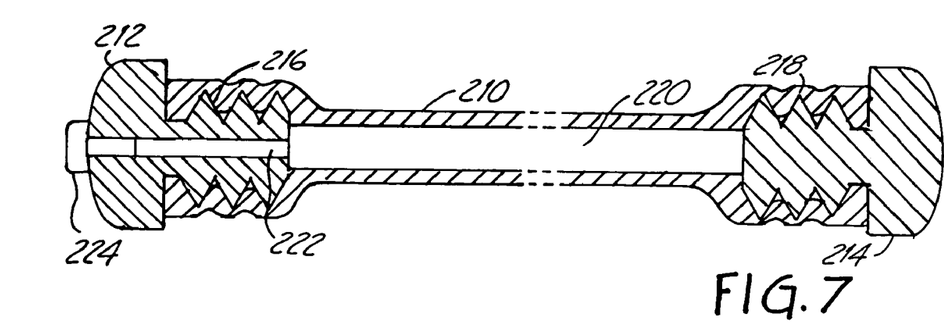
FIG. 7 is a section view of a simple squeaker system according to a second embodiment of the present invention.

FIG. 7 is a section view of a squeaker and squeaker chamber system illustrating the principles of a second embodiment of the present invention. The squeaker system illustrated in FIG. 7 comprises an elongated flexible and resilient hollow tube 210, such as surgical tube, having rigid plugs 212 and 214 closing each end of tube 210. Plugs 212 and 214 include serrations 216 and 218 having a slightly larger diameter than the inside diameter of tube 210 so that the plugs are mounted to and retained by the tube to form an enclosed squeaker chamber 220 within the tube. One of the plugs, for example, plug 212, includes a slot or aperture 222 extending axially through the plug. Squeaker device 224 is mounted in aperture 222. The squeaker device includes a passage and a vibrating member (not shown) to produce a noise as air passes through the squeaker passage into and out of chamber 220. If the tube is formed of a plastic or other material that seals upon itself by application of heat or other treatment, the end of the tube may be sealed by so treating the tube instead of by plug 214.

In this embodiment, tube 210 is sufficiently flexible so that it may be twisted and manipulated into various configurations and held in place within the toy. The tube is sufficiently resilient so that collapse or compression of at least a portion of its cross-section upon application of an external force to the tube will reduce the volume of chamber 220 and thereby expel air through squeaker 224. The resilience of tube 210 also permits the tube to return to its relaxed cross-sectional shape upon release of the external force, thereby drawing air through squeaker 224 into chamber 222. The ease of collapsing or compression of the tube should be adequate for the expected external force, such as the biting action of a carnivore (in the case of a pet toy) or pressing by a child (in the case of a child's toy). The expected external force will be based on the size of the toy, which in turn is based on the weight of the animal or age of the child, as the case may be. Tube 210 may be of any desired cross-sectional shape. In some embodiments the tube may have a cross-sectional shape and/or wall thickness that varies along its length. Nevertheless, tubes having a circular cross-section are preferred due to availability and the natural tendency of a circular tube to return to its circular cross-sectional shape upon release of the external force.

The length of tube 210 is not controlling on the present invention, since it is not necessary that the entire tube be collapsed for purposes of operating squeaker 224. Instead, it is only important that a portion of the tube be collapsed to operate the squeaker. We have found that ordinary surgical tubing having an inside diameter between about 0.4 and 0.5 inches and wall thickness of approximately 0.1 inches, is adequate for the present purposes.

One feature is that tube 210 may be long enough to extend distally from squeaker device 224 so that the squeaker device may be positioned at a desired location within the toy and operated by squeezing the tube (such as when the animal bites the toy) at another location of the toy distal from the squeaker device. For example, a squeaker system in a toy having an animal or figurine shape might incorporate a squeaker system wherein the squeaker device 224 is positioned in the head of the figure and tube 210 extends through the body to the arms and legs. As will become apparent in connection with the embodiments of FIGS. 12 and 13, the toy may have a more regular geometric shape, such as a ball, disk or ring, wherein the squeaker system is configured to permit squeezing or biting the toy at nearly any location to produce a sound at the one location of the squeaker device.

When the toy is bit or squeezed at a location containing a portion of tube 210, air will be expelled from chamber 220 through squeaker 224 to produce a noise. The noise will be produced by squeaker 224 regardless of where the animal bites along the length of tube 210. However, should the animal bite on the toy at the location of rigid plug 214 or 212 (i.e., at the location of squeaker 224), or so near a rigid plug that the rigidity of the plug body prevents collapse of the tube, the tube is not collapsed and little or no air is expelled from squeaker chamber 220 and little or no sound is emitted.

Figure 8:
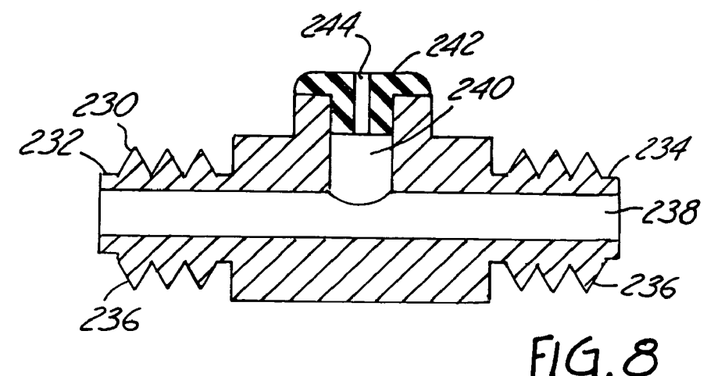
FIGS. 8–10 are views of various coupler devices useful in squeaker systems in various configurations of toys according to the second embodiment of the invention.

FIGS. 8–11 illustrate various couplers for the squeaker system of this second embodiment that may be employed to create squeaker systems for various toys. FIG. 8 illustrates a rigid coupler 230 having arms 232 and 234, each having external serrated portions 236 for attachment within ends of respective tubes or tube sections 210 (not shown in FIG. 8). An internal passage 238 extends through coupler 230 and arms 232 and 234. Aperture 240 extends perpendicularly to passage 238 to receives a squeaker 242 having a squeaker passage 244 containing a reed (not shown) or other noise-making device.

Figure 9:
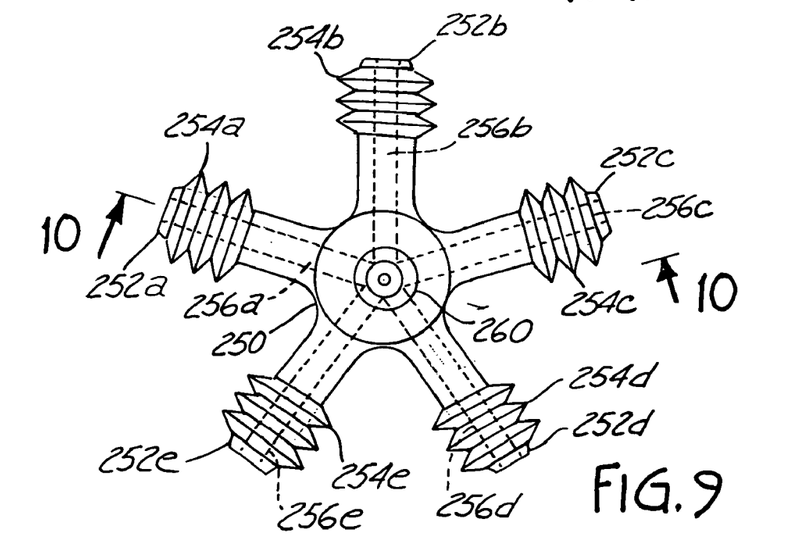
Figure 10:
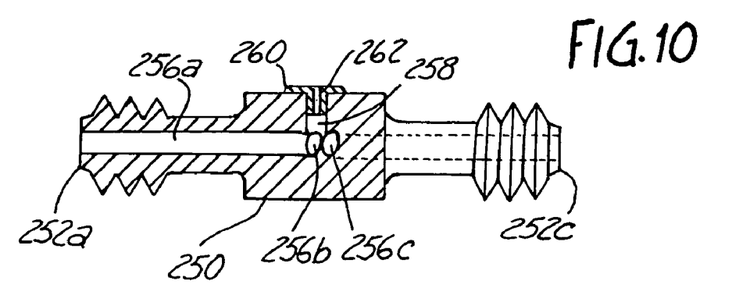

FIGS. 9 and 10 illustrate a rigid coupler 250 having a plurality of arms, 252a–e, each having serrated portions 254a–e each arranged to receive a respective end of a tube 210. Coupler 250 is shown having five arms 252a–e symmetrically arranged at 72° angles to each other around a central point, but the number of arms and symmetry of arrangement of the arms may vary, depending upon the particular application of the coupler. Each arm 252a–e includes an axial passage 256a–e terminating at central aperture 258 (shown in FIG. 10) extending perpendicularly to passages 256a–e. Squeaker 260 is supported within aperture 258 so that air may be expelled from, or admitted into internal passage 262 of squeaker 260 to transfer air between one or more of passages 256a–e upon collapsing or relaxing of an associated tube 210 (not shown in FIGS. 9 and 10).

Figure 11:
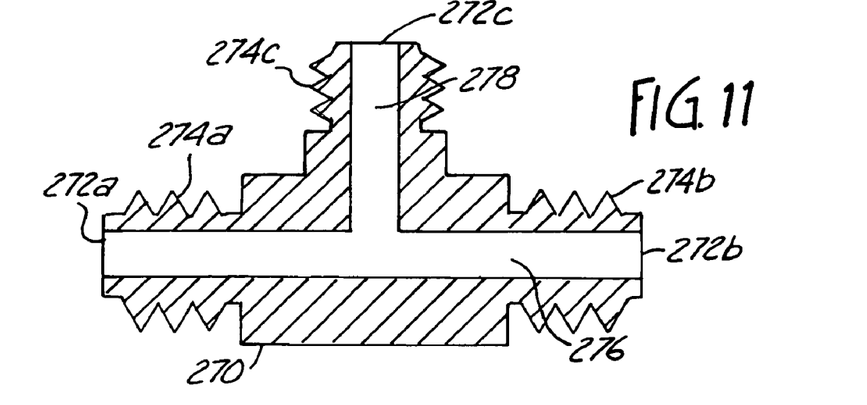
FIGS. 11–18 are views of various embodiments of toys employing squeaker systems using various couplers of FIGS. 8–10.

FIG. 11 illustrates a rigid coupler 270 having three arms 272a–c in the form of a tee, each having serrated coupling portions 274a–c for coupling to ends of tubes 210 (not shown in FIG. 11). In this version, coupler 270 has no squeaker, and is used with other couplers or plugs, such as plug 212 (FIG. 7) and/or couplers 230 and/or 260 (FIGS. 8–10). Coupler 270 includes a passage 276 extends through arms 272a and 272b, intersecting passage 278 through arm 272c. Coupler 270 permits coupling three tubes 210 together in a single configuration.

Figures 12, 13:
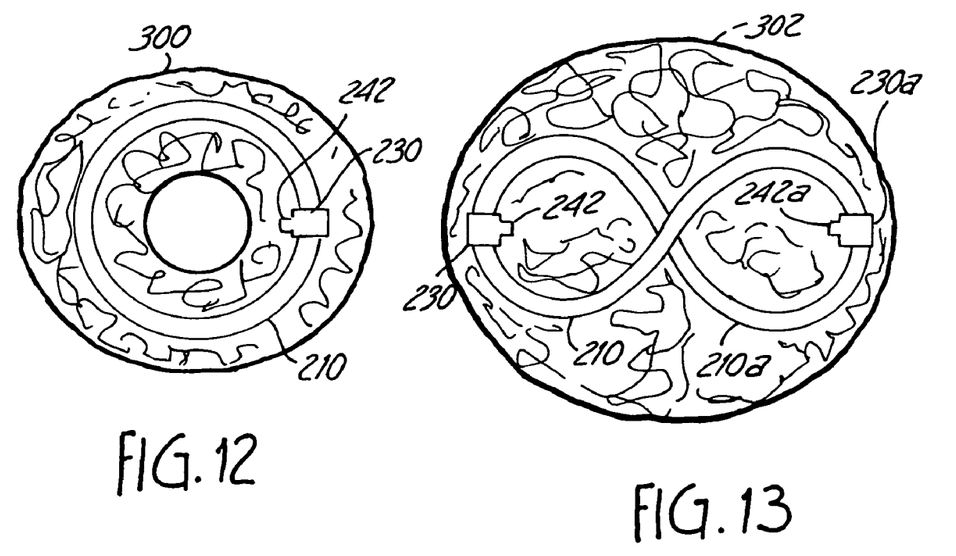

FIG. 12 illustrates a compressible three-dimensional ring or disk toy 300 having a squeaker system in the form of a ring employing coupler 230 (FIG. 8) and tube 210. Toy 300 is formed in a conventional manner comprising a flexible cover, such as fabric or artificial fur, encasing a compressible filler material, such as synthetic foam rubber. The squeaker system is held within the toy by the filler material, such as by nesting the squeaker system in the toy, and extends along the toy contour. In this case, opposite ends of tube 210 are coupled to serrated portions 236 of arms 232 and 234 of coupler 230 to form a ring. Squeaker 242 is supported by coupler 230, and is preferably oriented toward the center of the ring and remote from the external surface of the toy to minimize the ability of the animal to access the squeaker to dislodge the squeaker from the toy. When the animal bites on any portion of toy 300 containing tube 210, other than directly on coupler 230 and squeaker 242, tube 210 will be compressed at the region of the bite and expel air through squeaker 242 to emit a sound. Upon release of the bite by the animal, tube 210 will return to its relaxed state, drawing air back through squeaker 242 into the chamber, thereby producing another noise.

FIG. 13 illustrates a compressible spherical ball 302 containing a pair of tubes 210 and 210a coupled together by two couplers 230 and 230a (FIG. 8), each having an independent squeaker 242 and 242a. Ball 302 is constructed in a manner similar to toy 300. In this case, when the animal bites on ball 302, collapsing either or both tubes 210 and 210a, air will expel through one or both squeakers 242 and 242a, thereby generating noise by the respective squeakers. Upon release of the bite by the animal, air will be drawn back into tubes 210 and/or 210a through squeakers 242 and/or 242a, thereby producing another noise.

Figure 14:
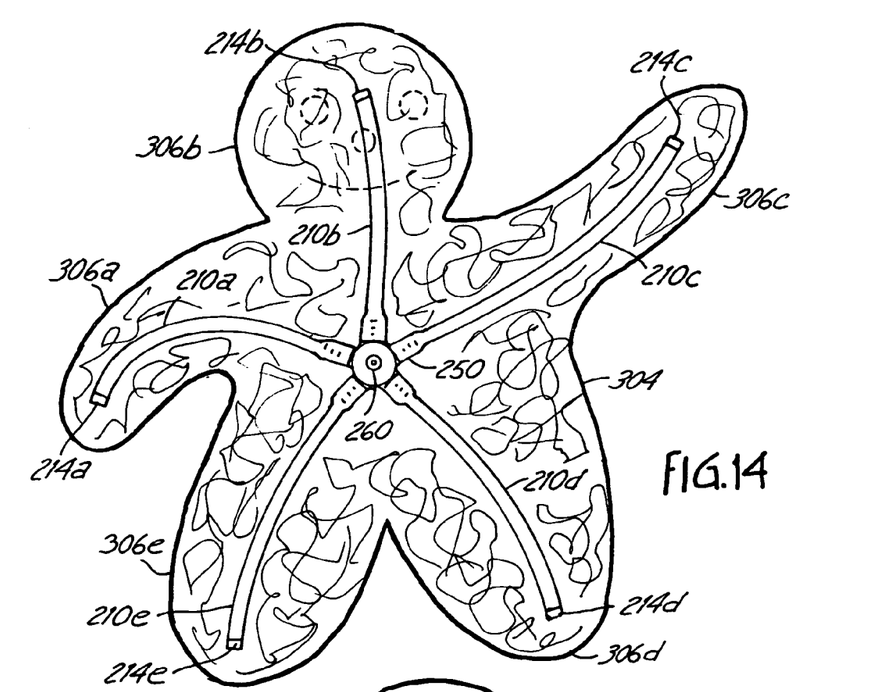

FIG. 14 illustrates another compressible toy 304 in the form of a figurine or doll. Toy 304 is constructed in the same manner as toys 300 and 302. Toy 304 has extremities 306a–e representing a head, arms and legs of the figure. A tube 210a–e extends along the length of each respective extremity 306a–e terminating at a distal end by a respective plug 214a–e (FIG. 7). The proximal end of each tube 210a–e is coupled to respective arms of coupler 250 (FIGS. 9–10). When the animal bites toy 304 at the location of any tube 210a–e, air is displaced from the associated squeaker chamber and is expelled through squeaker passage 263 in squeaker 260 (FIG. 10), thereby emitting a sound. The sound is emitted from the squeaker at a central location on the toy regardless of which tube 210a–e is collapsed or compressed, or where on that tube such collapsing occurs. When the animal releases the toy, and hence the tube, air returns through squeaker 260 into the squeaker chamber of the previously compressed tube 210a–e, causing the squeaker to emit another sound. Thus, the animal may bite onto any extremity 306a–e of the toy to create a sound at the central location. However, because coupler 250 and squeaker 260 are rigid, biting at a central location on the toy will not produce a sound.

Figure 15:
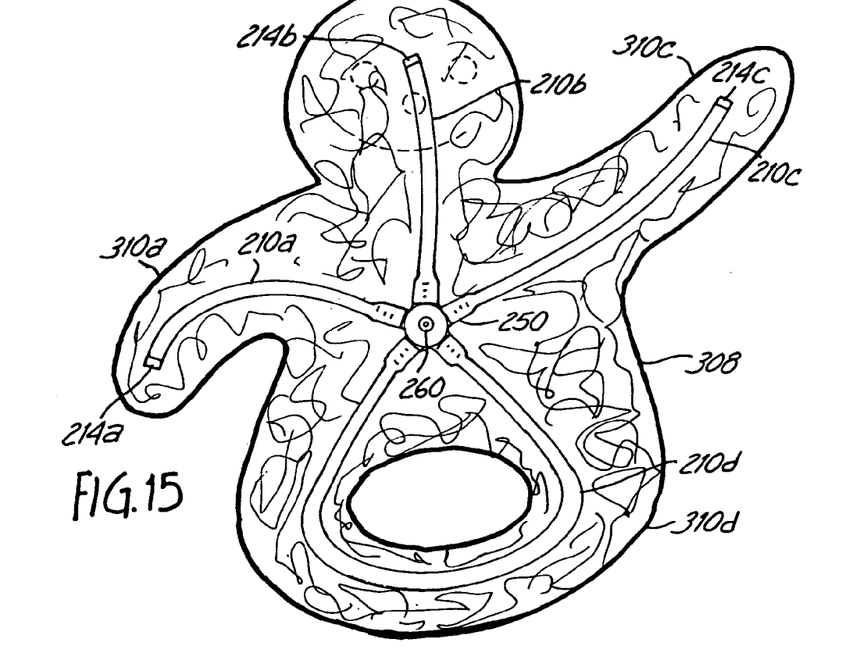

FIG. 15 illustrates a modification of the toy illustrated in FIG. 14 wherein toy 308 includes extremities 310a–d, with extremity being ring-shaped. Tubes 210a–c extend distally of coupler 250 within extremities 310a–c, the distal end of each tube 210a–c being closed with a plug 214 (FIG. 7). Tube 210d extends through the ring-shaped extremity 310d and has its ends joint to two arms of coupler 250, such as arms 252d and 252e (FIG. 9).

If desired, the passage in one of the arms of coupler 250 coupled to tube 210d might plugged or constricted so that air flows to and from the ring-shaped tube 210d from only one of the arms. Thus, passage 256e (FIG. 9) in arm 252e might be constricted so all air to and from tube 210d flows through passage 256d in arm 252d.

Figure 16:
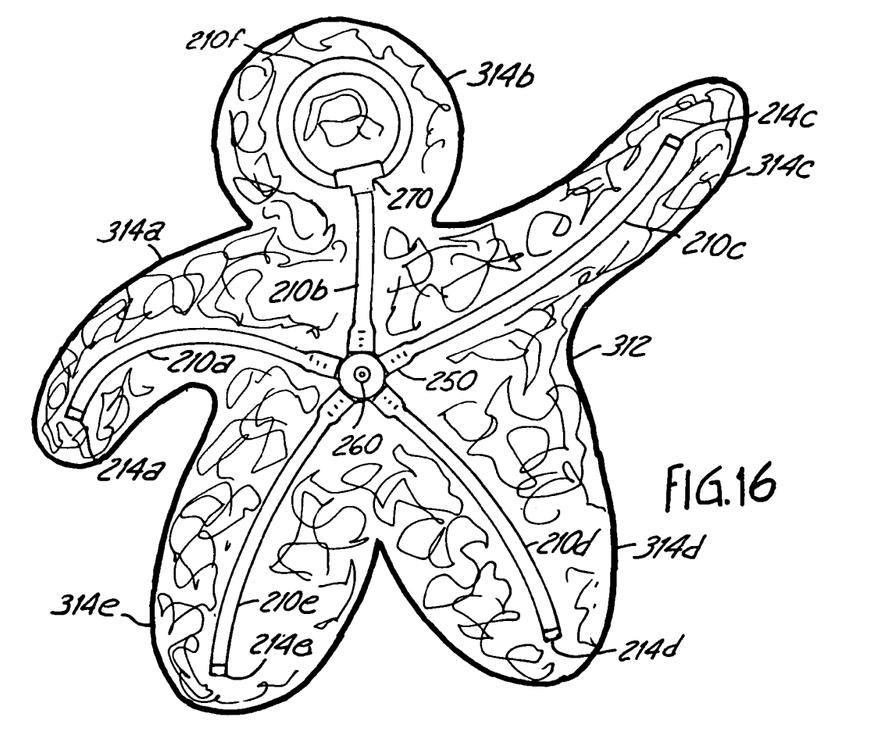

FIG. 16 illustrates another modification of the toy illustrated in FIG. 14 wherein toy 312 has extremities 314a–e, similar to extremities 306a–e in FIG. 14, but wherein a ring-shaped squeaker cavity is employed in one of the extremities, such as extremity 314b representing the head of the figure. In this case, the distal end of tube 210b terminates in a tee-coupler 270 (FIG. 11) rather than a plug, and a tube 210f is coupled in a ring to the opposite arms of coupler 270 forming a ring-shaped squeaker chamber.

Figure 17:
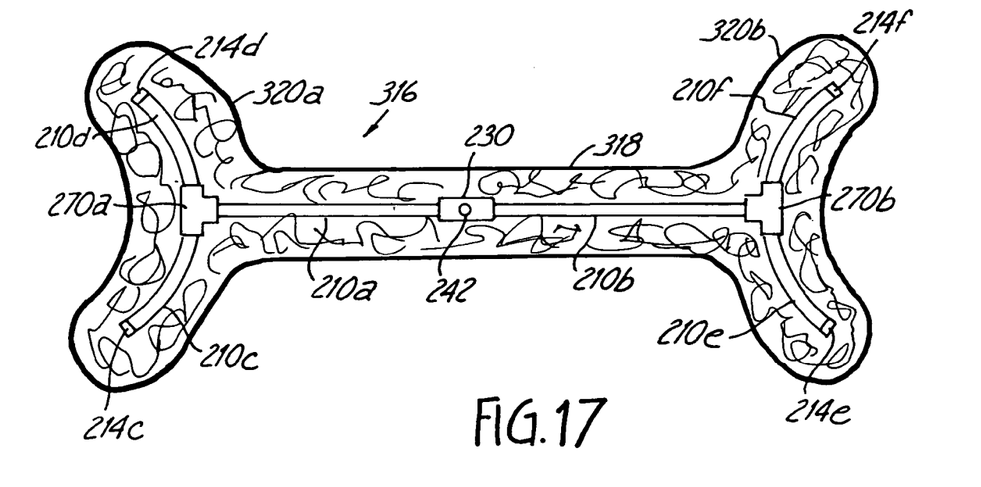

FIG. 17 illustrates another embodiment of a compressible toy 316 constructed in a manner similar to toys shown in FIGS. 12–16. Toy 316 is in the shape of a bone having a neck portion 318 joining two head portions 320a and 320b. Coupler 230 (FIG. 8) has a squeaker 242 arranged such that coupler 230 and squeaker 242 are at a central location in the neck of bone 316. Tubes 210a and 210b extend from opposite sides of coupler 230 to respective tee-couplers 270a and 270b (FIG. 11). Tubes 210c–f extend from respective couplers 270a or 270b into the heads 320a and 320b of bone 316 and are sealed with plugs 214c–f (FIG. 7). As in the case of the toys shown in FIGS. 12–16, when the animal bites onto a tube 210a–f at a location remote from coupler 230 and squeaker 242, air is expelled through the squeaker to emit a sound from toy 316. Upon release of the bite, air is again admitted through the squeaker to again produce a sound.

Figure 18:
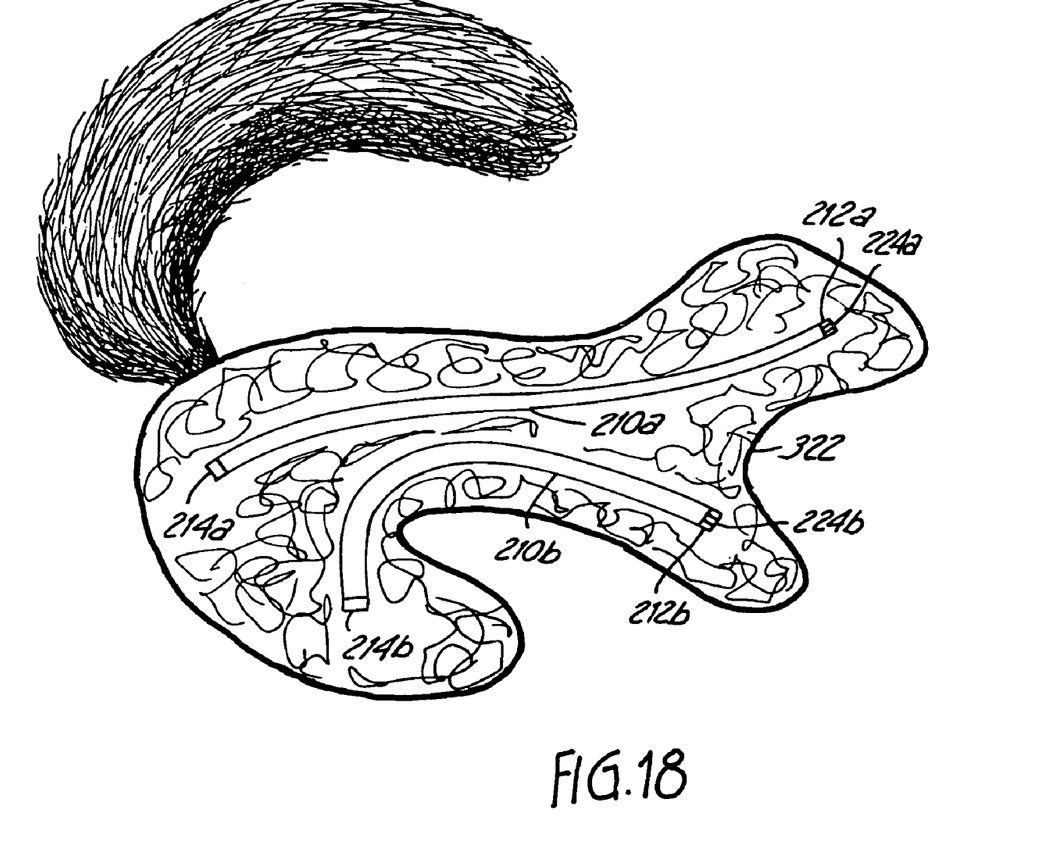

FIG. 18 illustrates another compressible toy 322, similar to the toy shown in FIG. 6, employing a pair of squeaker systems as illustrated in FIG. 7. Toy 322 is constructed in the same manner as described in connection with the toys of FIGS. 12–17 and includes a first squeaker system having a tube 210a terminating at one end with plug 212a containing a squeaker 224a and at the other end with closed plug 214a. A second squeaker system comprises tube 210b terminating at one end with plug 212b having a squeaker 224b and at the other end with closed plug 214b. Squeakers 224a and 224b may be chosen for different sound characteristics and arranged at different locations of toy 322. Tubes 210a and 210b may extend through different regions of toy 322 so that the animal generates one sound or the other depending on which region of toy 322 the animal may bite. Alternatively, tubes 210a and 210b may be in close proximity so the animal produces both sounds by biting the toy to compress both tubes 210a and 210b. As another alternative, a single tube could be used in place of tubes 210a and 210b, with a seal, such as a heat seal, crimping a central portion of the tube, so that a different sound is produced depending on what portion of the tube is squeezed. If desired, the tubes may be arranged so that the squeakers are in the same location within the toy so that a different sound emits from a single location, such as the head of the toy, depending on what region of the toy the animal bites.

The various configurations shown in FIGS. 3–6 and in FIGS. 12–18 are for illustration of the many variations of toys according to the invention and are not limiting on the invention.

The present invention thus provides a squeaker system for a squeezable toy, such as an animal or child's toy, wherein the squeaker device is positioned remote from the surface of the toy so that it cannot be easily accessed or pried loose by the animal or child playing with the toy. A three-dimensional compressible body contains a squeaker system that is effectively "hidden" from the animal or child by employing an elongated squeaker chamber in the body, so that that when the toy body is compressed adjacent a portion of the squeaker chamber distal from the squeaker device, air is expelled from the squeaker chamber through the squeaker passage.

In the case of a child's toy, the squeaker device may be place at a desired location such as within the head of a doll or other figurine, and the active portion of the squeaker chamber is located adjacent regions of the toy ornamented for pressing by the child. This feature increases hand-eye coordination of the child by training the child to press the toy at a specific location other that at the squeaker device.

It will be appreciated that while the invention is described in connection with pet toys, it is also applicable to other toys, including children's toys. More particularly, the recessed squeaker device distal from the outer surface of the toy is particularly useful in children's toys as a safety feature. Moreover, the use of elongated resilient members to remove the actuation portion of the squeaker chamber from the squeaker device can serve as a child's training device to promote hand/eye coordination, rewarding the child with a sound from a different location on the toy from that which the child might press or squeeze.

Although the present invention has been described with reference to preferred embodiments, workers skilled in the art will recognize that changes may be made in form and detail without departing from the spirit and scope of the invention.

What is claimed is:

1. A toy comprising:
    a three-dimensional compressible body having a continuous outer surface;
    a single three-dimensional resilient member fully enclosed within the outer surface of the compressible body and having a wall for providing a squeaker chamber, the squeaker chamber having a length extending along the body, at least a portion along the length of the squeaker chamber being collapsible due to compression of at least a corresponding portion of the body; and at least one sound-emitting squeaker device mounted to the wall between the squeaker chamber and a region within the outer surface of the compressible body outside the squeaker chamber.

2. The toy of claim 1, wherein the resilient member and at least one squeaker device are so disposed and arranged that collapsing a portion of the squeaker chamber distal to the squeaker device causes the squeaker device to emit a sound at a higher intensity than the squeaker device emits due to collapsing a portion of the squeaker chamber proximal to the squeaker device.

3. The toy of claim 1, further including a compressible filler material located between the continuous outer surface of the body and the wall of the resilient member.

4. The toy of claim 1, wherein the resilient member is formed of an elastic material having memory such that the resilient member substantially returns to its original size after release of an elongation force on the resilient member.

5. The toy of claim 4, wherein the compressible body includes a central portion and a plurality of extremities extending from the central portion, wherein the squeaker device is supported in the central portion and the resilient member includes a plurality of appendages extending into respective extremities.

6. The toy of claim 4, wherein the compressible body is in the form of a ring or disc and the resilient member is in the form of a ring within the body.

7. The toy of claim 4, wherein the compressible body is in the form of a sphere and the resilient member is in the form of a pair of connected spheres.

8. The toy of claim 1, wherein the resilient member comprises at least one resilient tube.

9. The toy of claim 8, wherein the compressible body includes a central portion and a plurality of extremities extending from the central portion, wherein the squeaker device is supported in the central portion and the squeaker chamber comprises a plurality of resilient tubes extending into respective extremities.

10. The toy of claim 8, wherein the compressible body is in the form of a ring or disc and the resilient tube has first and second ends coupled to the squeaker device to form a ring within the body.

11. The toy of claim 8, wherein the compressible body is in the form of a sphere and the resilient tube has first and second ends coupled to the squeaker device to form a figure-8 pattern within the body.

12. A toy comprising:
a three-dimensional compressible body having a continuous outer surface;

at least one squeaker device supported within the body; and a single three-dimensional resilient member fully enclosed within the outer surface of the compressible body and providing a compressible squeaker chamber in fluid communication with the at least one squeaker device, the squeaker chamber being collapsible due to compression of at least a corresponding portion of the body and so disposed and arranged wit respect to the squeaker device that collapsing a portion of the squeaker chamber distal to the squeaker device causes a high volume of fluid in the squeaker chamber to be discharged through the squeaker device and collapsing a portion of the squeaker chamber proximal to the squeaker device causes a low volume of fluid in the squeaker chamber to be discharged through the squeaker device.

13. The toy of claim 12, further including a compressible filler material located between the continuous outer surface of the body and the wall of the resilient member.

14. The toy of claim 12, wherein the resilient member comprises a bladder that has memory such that the bladder substantially returns to an original size after release of an elongation force on the bladder.

15. A toy comprising:
a three-dimensional compressible body having a continuous outer surface;

at least one squeaker device enclosed and supported within the outer surface of the body;

an elongated compressible squeaker chamber fully enclosed within the outer surface of the compressible body, at least a portion of the squeaker chamber being collapsible due to compression of at least a corresponding portion of the body; and a single three-dimensional resilient member fully enclosed within the outer surface of the compressible body and fully enclosing the squeaker chamber that is in fluid communication with the at least one squeaker device, the squeaker chamber so disposed and arranged with respect to the at least one squeaker device that when collapsing a portion of the squeaker chamber in a region distal from the squeaker device and adjacent at least a portion of the squeaker chamber, fluid is expelled from the squeaker chamber to operate the squeaker device, and when the body is compressed at a region proximal to the squeaker device, fluid is not expelled from the squeaker chamber and the squeaker device is not operated.

16. The toy of claim 15, wherein the resilient member comprises at least one resilient tube.

* * * * *

UNITED STATES PATENT AND TRADEMARK OFFICE
CERTIFICATE OF CORRECTION

PATENT NO.         : 7,144,293 B2
APPLICATION NO.    : 10/916940
DATED              : December 5, 2006
INVENTOR(S)        : Charles D. Mann et al.

It is certified that error appears in the above-identified patent and that said Letters Patent is hereby corrected as shown below:

Column 10, line 9 change "wit" to --with--.

Signed and Sealed this

Sixth Day of March, 2007

JON W. DUDAS
*Director of the United States Patent and Trademark Office*